June 28, 1927.
J. W. ROOKWOOD
SEEDER
Filed Oct. 5, 1925
1,634,213
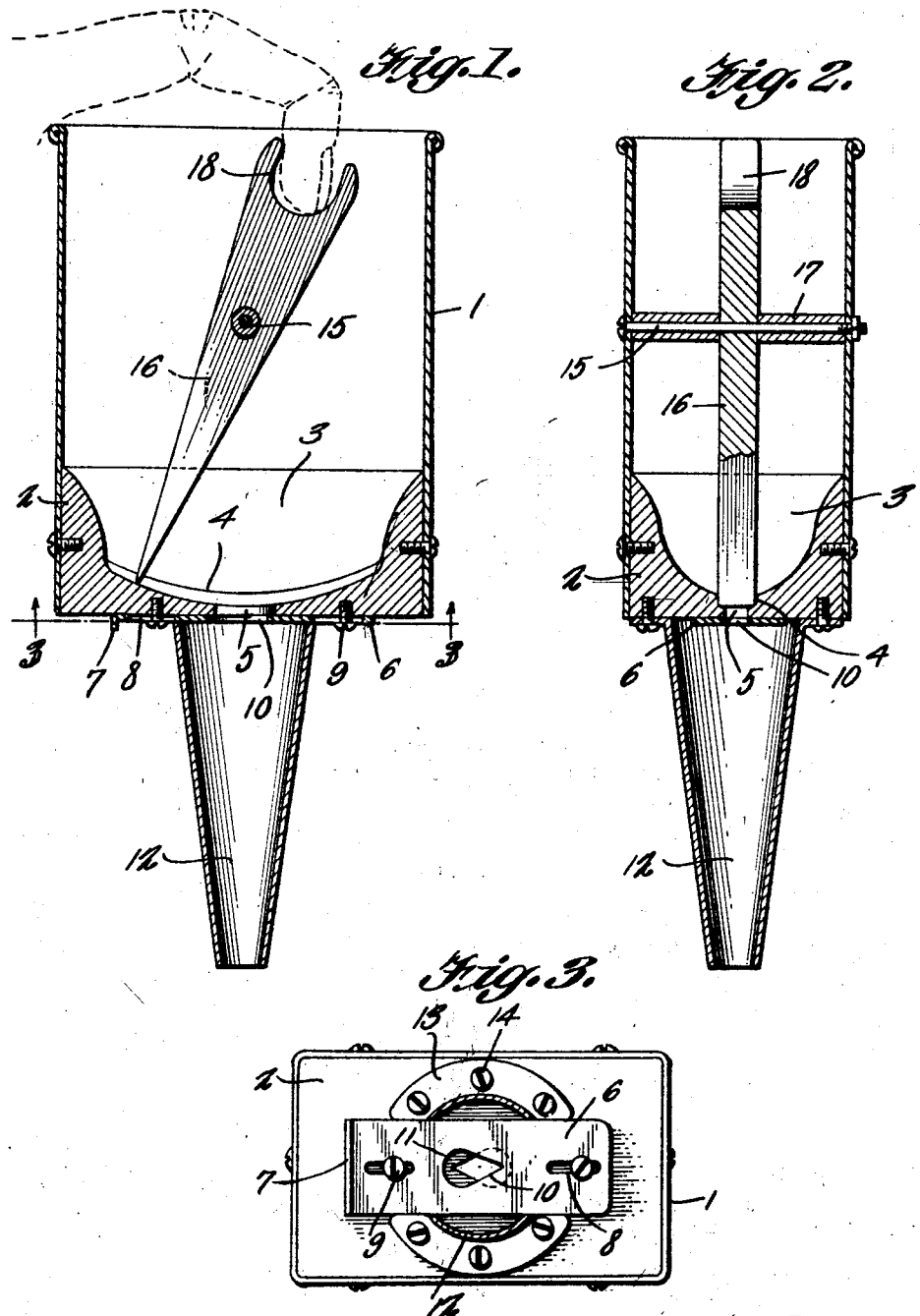

Patented June 28, 1927.

1,634,213

UNITED STATES PATENT OFFICE.

movable bottom therefor, having a concave upper face formed with a central opening, a longitudinal channel within said bottom traversing the opening, a manually actuated agitator having its lower end movable through said channel, an outlet spout having communication with the opening, an adjustable plate mounted upon the spout and the bottom and formed with a V-shaped opening having a rounded end portion and means whereby said plate may be manually adjusted to regulate the flow of material from the hopper through the spout.

In testimony whereof I affix my signature.

JAMES W. ROOKWOOD.